US009823998B2

(12) United States Patent
Ferrara et al.

(10) Patent No.: US 9,823,998 B2
(45) Date of Patent: Nov. 21, 2017

(54) TRACE RECOVERY VIA STATISTICAL REASONING (71) Applicant: International Business Machines Corporation, Armonk, NY (US)

(72) Inventors: Pietro Ferrara, White Plains, NY (US); Marco Pistoia, Amawalk, NY (US); Omer Tripp, Bronx, NY (US); Eunho Yang, Wood Ridge, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/957,003

(22) Filed: Dec. 2, 2015

(65) Prior Publication Data
US 2017/0161176 A1 Jun. 8, 2017

(51) Int. Cl.
*G06F 9/44* (2006.01)
*G06F 11/36* (2006.01)

(52) U.S. Cl.
CPC ............ *G06F 11/3672* (2013.01); *G06F 8/73* (2013.01)

(58) Field of Classification Search
USPC ........................................ 717/131, 130, 127
See application file for complete search history.

(56) References Cited

U.S. PATENT DOCUMENTS

| | | | |
|---|---|---|---|
| 5,960,198 A * | 9/1999 | Roediger ............ | G06F 11/3466 714/E11.2 |
| 6,817,010 B2 | 11/2004 | Aizenbud-Reshef et al. | |
| 8,117,601 B2 * | 2/2012 | Owens, II .......... | G06F 11/3688 714/35 |
| 8,423,965 B2 * | 4/2013 | Goel ................... | G06F 9/30018 717/126 |
| 8,443,343 B2 * | 5/2013 | Blomstedt .............. | G06F 8/433 717/136 |
| 8,489,931 B2 * | 7/2013 | Keromytis .............. | G06F 11/08 714/38.1 |
| 8,799,884 B2 * | 8/2014 | Dreyer .................... | G06F 8/456 712/203 |
| 8,924,938 B2 * | 12/2014 | Chang ................. | G06F 11/3688 717/126 |
| 8,930,884 B2 | 1/2015 | Joukov et al. | |
| 2002/0059202 A1 * | 5/2002 | Hadzikadic ......... | G06F 17/3071 |
| 2002/0144245 A1 * | 10/2002 | Lueh ........................ | G06F 8/41 717/140 |
| 2004/0103401 A1 * | 5/2004 | Chilimbi ............. | G06F 11/3612 717/130 |

(Continued)

OTHER PUBLICATIONS

NPL-Berg-IEEE-2004, Berg et al., Article Title: Statcache: A Probabilistic Approach to Efficient and Accurate Data Locality Analysis, Published in: Performance Analysis of Systems and Software, 2004 IEEE International Symposium on—ISPASS, 2004.*

(Continued)

*Primary Examiner* — Wei Zhen
*Assistant Examiner* — Hossain Morshed
(74) *Attorney, Agent, or Firm* — Daniel P. Morris; McGinn IP Law Group, PLLC (57) ABSTRACT

A method (and system) for trace recovery includes retrieving a code listing from a memory and performing a static analysis on the retrieved code listing. Based on the static analysis, profiling instructions are inserted in the code.

18 Claims, 4 Drawing Sheets

(56) References Cited

U.S. PATENT DOCUMENTS

| | | | | |
|---|---|---|---|---|
| 2004/0131056 A1* | 7/2004 | Dark | ...................... | H04L 43/00 370/386 |
| 2005/0125777 A1* | 6/2005 | Calder | ................ | G06F 11/3457 717/131 |
| 2007/0136035 A1* | 6/2007 | Minor | ..................... | G06F 19/24 703/2 |
| 2008/0126831 A1* | 5/2008 | Downey | ............... | G06F 11/008 714/4.2 |
| 2009/0077543 A1* | 3/2009 | Siskind | ................... | G06F 8/447 717/136 |
| 2009/0282393 A1* | 11/2009 | Costa | ..................... | G06F 21/54 717/132 |
| 2010/0017791 A1* | 1/2010 | Finkler | .............. | G06F 11/3409 717/158 |
| 2010/0115494 A1* | 5/2010 | Gorton, Jr. | .......... | G06F 11/3466 717/128 |
| 2010/0146220 A1* | 6/2010 | Panchenko | ........ | G06F 11/3471 711/154 |
| 2010/0280985 A1* | 11/2010 | Duchon | ................ | G06Q 10/10 706/52 |
| 2010/0306745 A1* | 12/2010 | Sharabani | .......... | G06F 11/3636 717/130 |
| 2012/0151453 A1* | 6/2012 | Finking | .............. | G06F 11/3624 717/130 |
| 2013/0124538 A1* | 5/2013 | Lee | .................... | G06F 17/3053 707/749 |
| 2013/0263102 A1* | 10/2013 | Ergan | ..................... | G06F 8/443 717/158 |
| 2014/0215443 A1* | 7/2014 | Voccio | ............... | G06F 11/3612 717/128 |
| 2014/0222997 A1* | 8/2014 | Mermoud | ............ | H04L 41/142 709/224 |

OTHER PUBLICATIONS

Chang et al., "Efficient and Extensible Security Enforcement Using Dynamic Data Flow Analysis." Proceedings of the 15th ACM Conference on Computer and Communications Security. ACM, 2008.

Sparks et al. "Automated Vulnerability Analysis: Leveraging Control Flow for Evolutionary Input Crafting." Computer Security Applications Conference, 2007. ACSAC 2007. Twenty-Third Annual. IEEE, 2007.

Wuchner et al., "Data loss Prevention Based on Data-driven Usage Control." Software Reliability Engineering (ISSRE), 2012 IEEE 23rd International Symposium on. IEEE, 2012.

Tripp et al., "A Bayesian Approach to Privacy Enforcement in Smartphones." USENIX Security. 2014.

Sambasivan et al. "So, You Want to Trace Your Distributed System? Key Design Insights from Years of Practical Experience." (CMJJ-PDL-14102) Apr. 2014.

* cited by examiner

TRACE RECOVERY VIA STATISTICAL REASONING

BACKGROUND OF THE INVENTION

Field of the Invention

The present invention generally relates to program analysis. More particularly, an alternative, probabilistic method for program tracking initially performs a static analysis to determine a relatively few points at which profiling instructions are interweaved, from which points an actual data flow during an execution can be inferred, with a high probability.

Description of the Related Art

Dataflow tracking is a fundamental form of program analysis. There are multiple applications of high practical value for dataflow tracking, including, for example, runtime security analysis and/or enforcement, runtime privacy analysis and/or enforcement, runtime detection of concurrency bugs, speculative parallelization (e.g., in the form of software transactional memory), testing of refactoring transformations, etc. Common use cases include such practical applications as code parallelization, information-flow security, and typestate checking, to name a few examples. Dataflow tracking requires local monitoring at the level of intermediate states and atomic program statements. In practice, this leads to severe complications, including (i) native code, (ii) complex libraries and (iii) scalability.

Existing solutions to the scalability challenge, for example, TaintDroid, all turn in the direction of heavy engineering to achieve nontrivial and limited-value performance optimizations, which often come at the price of accuracy loss, such as overly conservative modeling of the dataflow relation. Native code and complex libraries are typically accounted for via hand-written summaries. These too require substantial time and effort to author, and are often approximate at best in representing the true dataflow behavior of their respective code.

Moreover, existing solutions for data-flow tracking are deterministic. They mandate the insertion of profiling instructions into the program at every code location to record and propagate flow of information. As such, they introduce significant performance slowdown (up to 700 times), have poor scalability, and are unable to handle various real-world scenarios, such as use of native code, where profiling instructions cannot be inserted and thus information-flow tracking is interrupted and the flow of interest is lost.

The present inventors have recognized that currently there is no satisfactory solution for dataflow tracking at the low level of individual statements. At the same time, there are no alternative approaches in existence, and so the current practice is to invest increasingly more manual effort—all ad hoc to target particular observed challenges—to enable practical applications of dataflow tracking, such as robust real-time security and privacy enforcement.

SUMMARY OF THE INVENTION

The present invention provides a fundamentally new approach to dataflow tracking, wherein tracking assumes the form of sparse sampling. That is, instead of recording dataflow behaviors at the granularity of every statement, the present invention restricts the recording to a small subset (or rather, subsequence) of the executed statements.

This addresses scalability, but leaves the big question of how to recover missed dataflow behaviors open. To address this issue, the method uses a statistical learning machinery, such that different hypotheses are conceived and evaluated concerning the code path connecting between two adjacent sampling points.

In an exemplary embodiment, the statistical learning is in the form of a Hidden Markov Model (HMM). A prototype implementation of the system enables comprehensive runtime dataflow tracking in large-scale software. This capability is currently beyond the reach of any other solution in existence, for the reasons outlined above.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-4, an exemplary embodiment of the method and structures of the present invention will now be explained.

The present invention teaches an alternative to existing methods for tracking information (or data) flow through a program. This can be done by assigning values between variables, passing arguments to methods, manipulating (e.g. concatenating) strings, etc.

Figure 1:
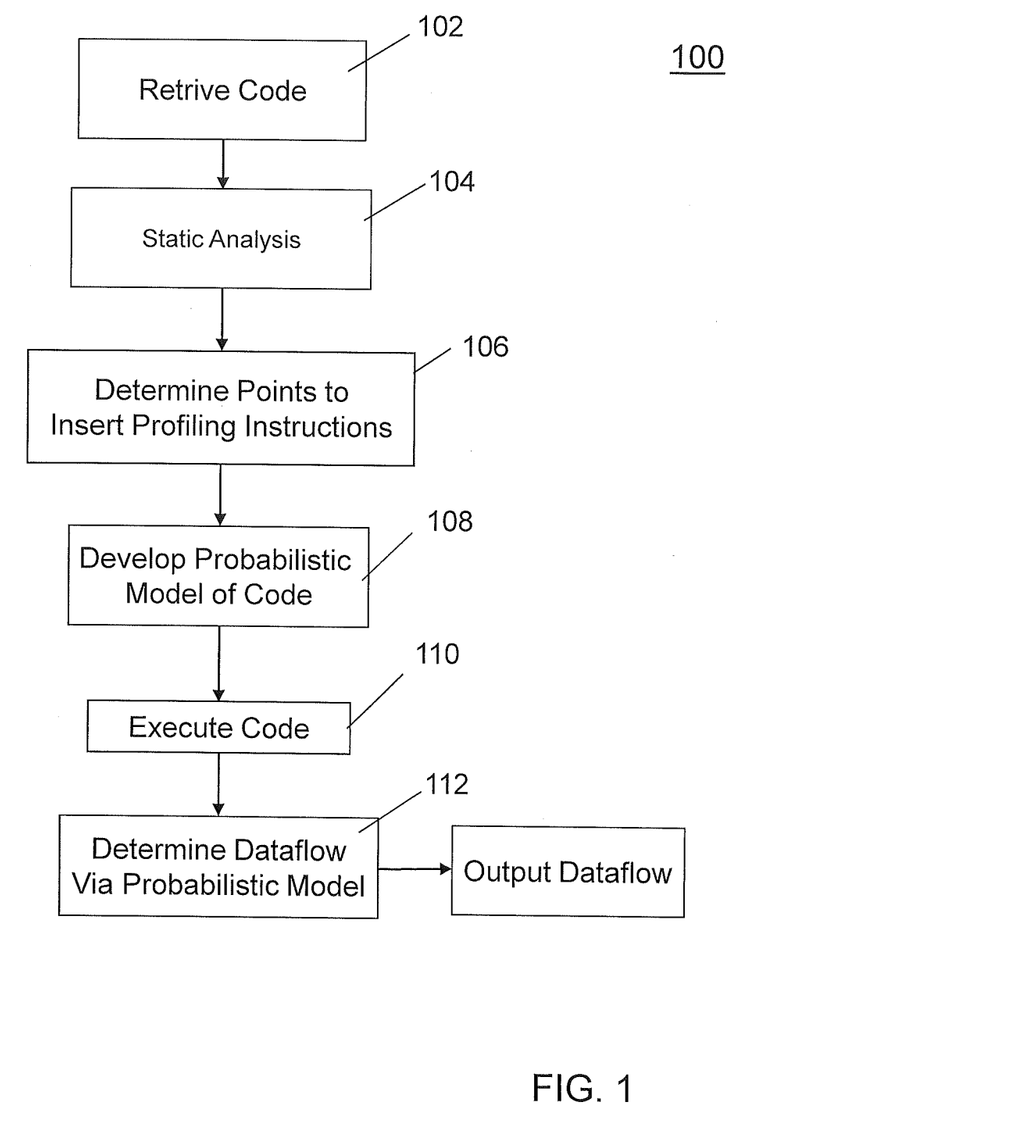
FIG. 1 shows an exemplary flowchart 100 of an embodiment of the method of the present invention.

In contrast to the deterministic methods of conventional systems, the method of the present invention, as exemplarily shown in flowchart format 100 in FIG. 1, is probabilistic, in that it interleaves only a small number of profiling instructions into the original code, and utilizes facts about the program's state of execution at these points to recover—with statistical confidence guarantees—the actual execution and information flow. As a concrete example, at the profiling points we may derive variable/value pairs, and examine across consecutive profiling points how variables values have changed.

In step 102, the code is retrieved from a memory. In step 104, correlating information about values and value changes with the code is done via an offline static analysis, which extracts an approximate model of the operations, and their (potential) effects on variables and values, along different execution paths. In step 106, only a relatively small number of profiling instructions are inserted into the code, at the branch points determined during the static analysis. The static analysis clearly would not include any coding segments, such as any native code or complex library code sections, dynamically loaded at execution.

This enables a principled statistical analysis algorithm to determine, with high probability, the execution- and dataflow behavior of the program based only on sparse instrumentation.

Thus, when the program is actually executed in step 108, facts about the program's state of execution at these few points permit a runtime dynamic dataflow tracking in step 110 to recover, with statistical confidence guarantees, the actual execution and information flow of the execution.

There are three advantages to the probabilistic approach of the present invention, compared to the existing deterministic alternatives:

First, there is significantly less impact on performance, as only few profiling instructions are inserted into the code.

Second, for the same reason, this approach is much more scalable than existing solutions. Here it is noted, to emphasize the importance of scalability, that today's programs can be huge (in the range of many millions of lines of code), even if the developer has written only 10 lines of source code, due to the massive size of the libraries supporting the application (e.g. an Android app, which requires the entire SDK (Software Development Kit), ad, and analytics libraries, etc).

Finally, this new approach is able to address inherent limitations of existing approaches, such as dynamic code loading and native code, as it is able to reconstruct the flow across points that cannot be instrumented in conventional methods.

As an illustration demonstrating the probabilistic nature of the approach of the present invention, consider the following code:

```
// prestate: [[ x = 6 ]] if (b) {
    x = x+1;
} else{
    nativeCall(x);
}
// poststate: [[ x = 7 ]]
```

Here there are two options for this exemplary code section. Either the true branch was traversed, in which case the value of variable x changes from 6 to 7, which is consistent with the profiling data, or the false branch was traversed, in which there is native code that could potentially increment x but could also have other effects (if any).

This lack of certainty is reflected probabilistically, e.g. by assigning a probability of 0.5 to the event that nativeCall( ) has incremented x. This creates a statistical bias toward the path through the true branch, and so the probabilistic analysis of the present invention would reflect that execution path along with its respective data-flow facts.

It should be noted from this example, that the sparse sampling technique of the present invention permits the nativeCall( ) function to be effectively bypassed in the execution and data-flow analysis. It should be clear that other coding problems of conventional methods, such as dynamic code loading, would be similarly bypassed during the sparse sampling technique based on the initial static evaluation.

Thus, the method of the present invention can be described as follows.

1. First, before executing the application, static analysis is applied to extract code paths within the application and associated dataflow behaviors. As an example, a conditional structure if (b) {x=y;} else {x=z;} yields two code paths. In the first, there is dataflow from y to x, whereas in the second, there is dataflow from z to x.

2. A probabilistic policy governs which executed statements s should be recorded. Deciding a subset of the statements that are candidates for recording is preferably done offline (at least partially), based, for example, on the program's structure, so as to minimize runtime overhead. The policy may treat all statements uniformly, deciding to record a given statement with some fixed probability p, but it can also be more contextual (e.g., biasing toward statements in a particular part of the code and/or adjusting probabilities dynamically based on the history of recorded statements).

3. Given statement s that has previously been recorded and newly recorded statement sÕ, a most likely path through the code that connects between s and sÕ is searched. Note, importantly, that there is often no need to recover the true path that was traversed, as different paths have the same dataflow behavior. It thus suffices to find a path that has the same (or very similar) dataflow behavior to the actual path.

The three steps described above are intimately related to each other. The first step yields a "database" of information on code paths and their respective dataflow behaviors. This suggests, toward the second step, where to place recording points that Ñ at runtime Ñ will yield concrete observations over the program's state. Finally, the third step relies on the observations, conjoined with the static information on code paths, to find a series of connecting paths through all the recording points.

Once a complete path through the code is reconstructed, that path carries with it a series of dataflow behaviors. These are applied toward dataflow tracking via reconstruction instead of the traditional approach of recording dataflow behaviors at the level of every statement in the program.

Also notice, importantly, that complex libraries as well as native code are addressed naturally by recovering the flow between the respective invocation and response points. This does not happen (purely) online. Instead, designated static analysis Ñ running offline per step 1 above Ñ computes the paths through the complex/native code offline.

Implementation

The approach of the present invention has been implemented such that flow between observation (or recording) points is recovered via Markovian reasoning, meaning a stochastic model is used by assuming that future states depend only on the present state and not on the sequence of events that preceded it.

The complete flow is treated as a Hidden Markov Model (HMM), such that the observations are the variable/value mappings and the random HMM variable points to the current program variable(s) to be tracked. It is noted that one having ordinary skill in the art understands that a hidden Markov model is a statistical Markov model in which the system being modeled is assumed to be a Markov process with unobserved (i.e., hidden) states.

From the above example, details, and the flowchart in FIG. 1, the present invention provides an alternative, probabilistic method for tracking information (or data) flow through a program by: (1) interleaving only a small number of profiling instructions into the original code; (2) utilizing facts about the program's state of execution at these points to recover, with statistical confidence guarantees, the actual execution and information flow; and (3) correlating information about values and value changes with the code is done via an offline static analysis which extracts an approximate model of the operations and their potential effects on variables and values along different execution paths, enabling a principled statistical analysis algorithm to determine with high probability the execution and data flow behavior of the program.

Such processing can, of course, be executed on any computer appropriately programmed to implement the methods described above, and could be implemented as a component module in any application program that implements one of the practical applications mentioned in the background section, e.g., code parallelization, information-flow security, or typestate checking. The present invention could also be implemented as a service, including, for example, servers on the Internet or a cloud service, that offer the method of the present invention as a service.

Exemplary Hardware Aspects, Using a Cloud Computing Environment

It is understood in advance that, although this section of the disclosure provides a detailed description on cloud computing, implementation of the teachings recited herein are not limited to a cloud computing environment. Rather, embodiments of the present invention are capable of being implemented in conjunction with any other types of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 2:
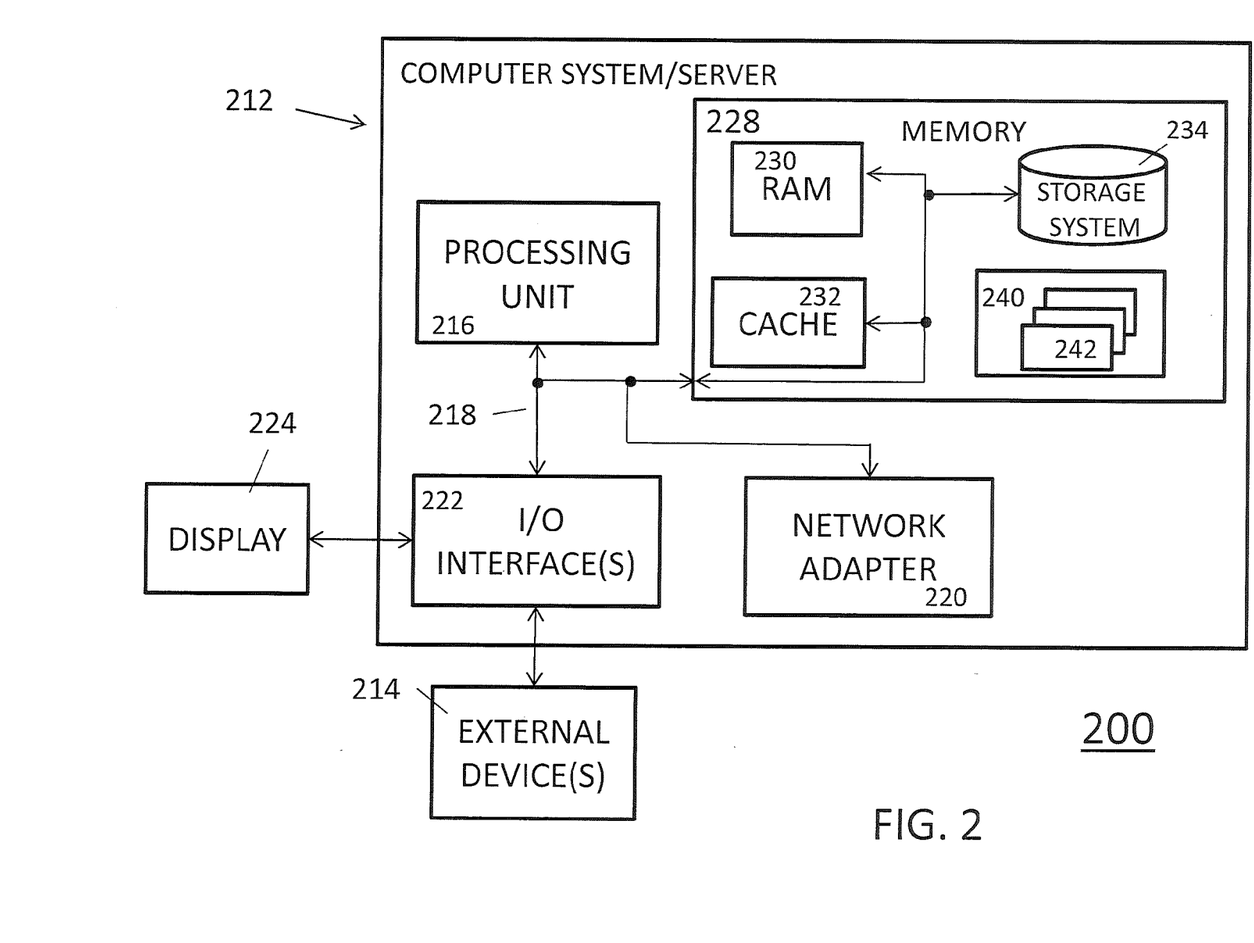
FIG. 2 depicts a cloud computing node 200 according to an exemplary embodiment of the present invention.

Referring now to FIG. 2, a schematic 200 of an example of a cloud computing node is shown. Cloud computing node 200 is only one example of a suitable cloud computing node and is not intended to suggest any limitation as to the scope of use or functionality of embodiments of the invention described herein. Regardless, cloud computing node 200 is capable of being implemented and/or performing any of the functionality set forth hereinabove.

In cloud computing node 200 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 212 in cloud computing node 200 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

Figure 3:
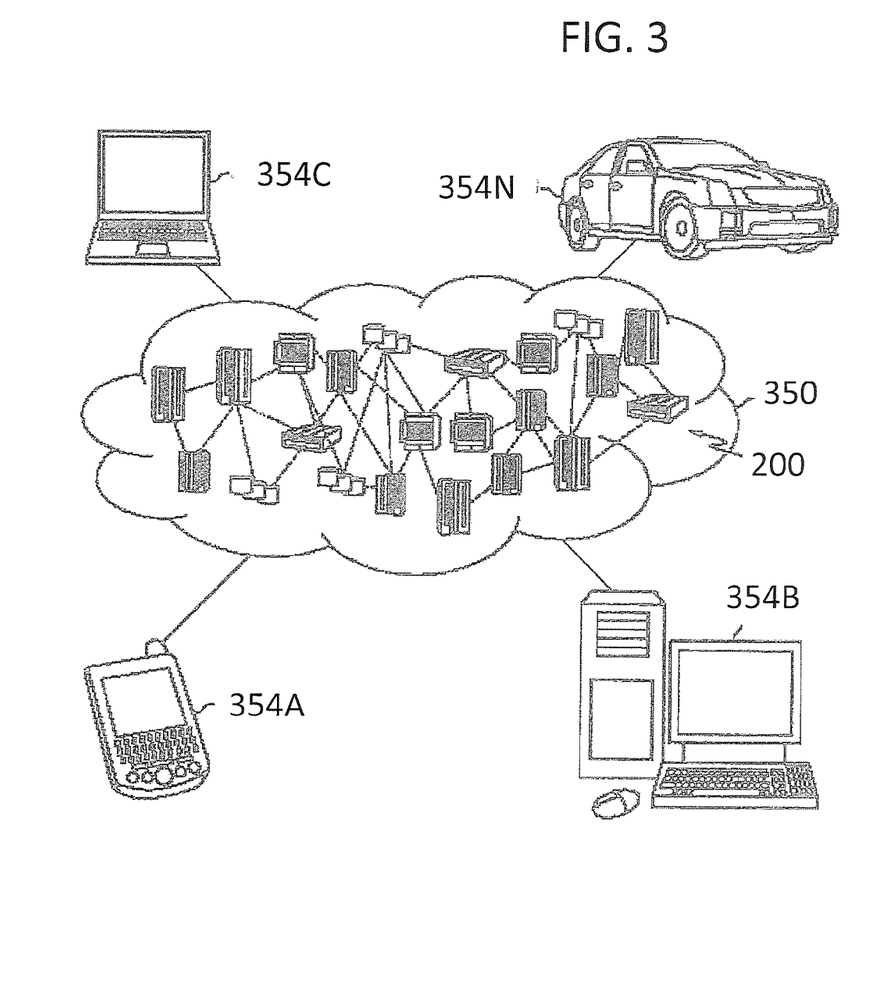
FIG. 3 depicts a cloud computing environment 300 according to an exemplary embodiment of the present invention.

Referring now to FIG. 3, an illustrative cloud computing environment 350 is depicted. As shown, cloud computing environment 350 comprises one or more cloud computing nodes 200 with which local computing devices used by cloud consumers, such as, for example, personal digital assistant (PDA) or cellular telephone 354A, desktop computer 354B, laptop computer 354C, and/or automobile computer system 354N may communicate. Nodes 200 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 3 are intended to be illustrative only and that computing nodes 200 and cloud computing environment 350 can communicate with any type of computerized device over any type of network and/or network addressable connection (e.g., using a web browser).

Figure 4:
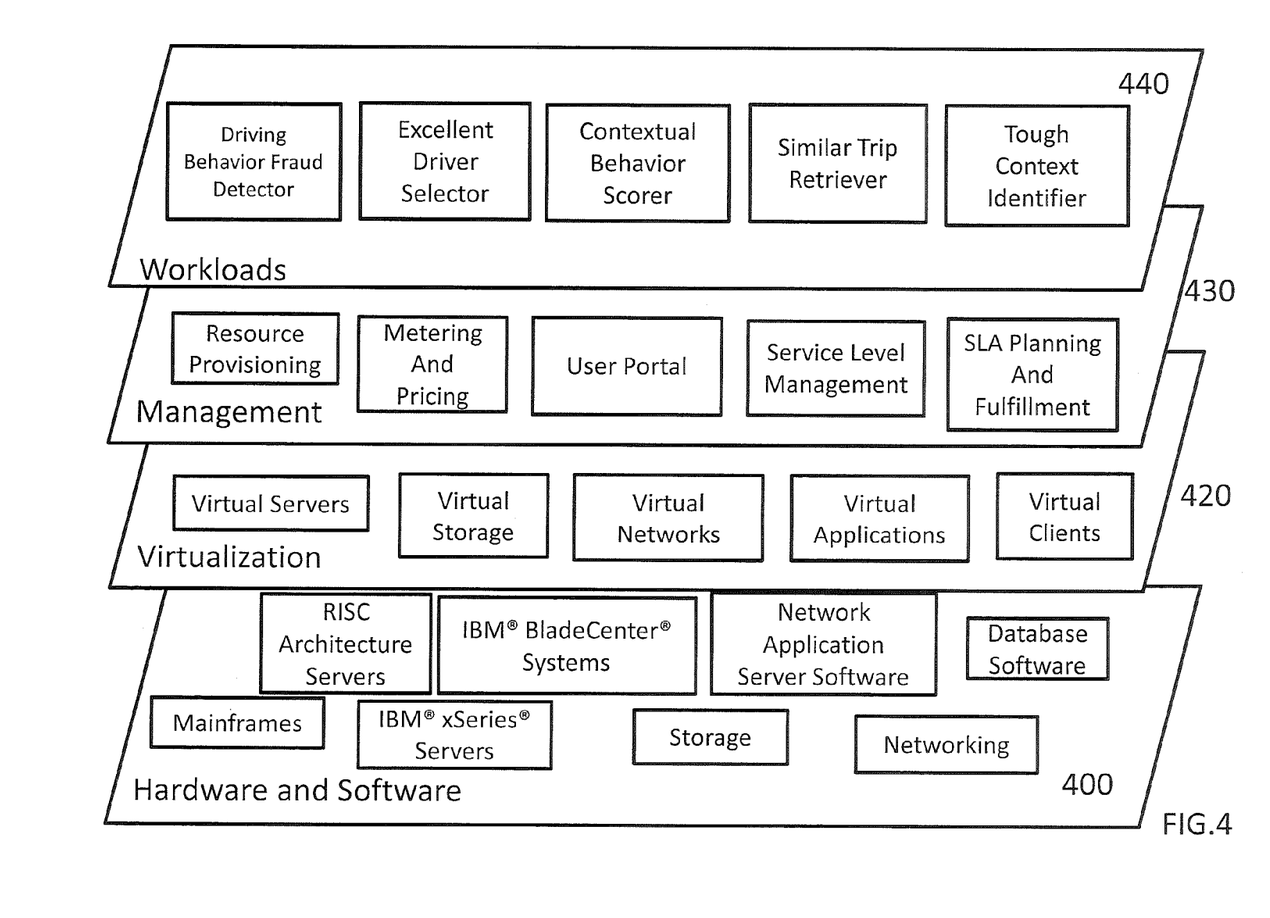
FIG. 4 depicts abstraction model layers 400-440 according to an exemplary embodiment of the present invention.

Referring now to FIG. 4, a set of functional abstraction layers provided by cloud computing environment 350 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide). The tooling that implements the present invention would be located in layer 400.

Virtualization layer 420 provides an abstraction layer from which the following examples of virtual entities may be provided: virtual servers; virtual storage; virtual networks, including virtual private networks; virtual applications and operating systems; and virtual clients. The virtual machines and network appliances that are generated and instantiated by the tooling of the present invention would operate on layer 420.

In one example, management layer 430 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment module provides pre-arrangement for, and procurement of, cloud computing resources for which a future requirement is anticipated in accordance with an SLA.

Workloads layer 440 provides examples of functionality for which the cloud computing environment may be utilized. Examples of workloads and functions which may be provided from this layer might include any number of functions and applications not even related to the present invention, such as mapping and navigation; software development and lifecycle management; virtual classroom education delivery; data analytics processing; transaction processing; and, more particularly relative to the present invention, data flow modules executing the flowchart steps shown in FIG. 1.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method, comprising:
   retrieving a code listing from a memory;
   performing a static analysis on said retrieved code listing to extract an approximate model of operations of the code listing including potential effects on changes of variables and values;
   based on said static analysis, creating an instrumented code by inserting profiling instructions at selected branch points of the retrieved code listing that collects sparse profiling data of execution and dataflow of the code listing, wherein the sparse profiling bypasses an execution and dataflow analyses of native code and dynamically loaded code;
   developing a probabilistic model for the retrieved code;
   executing the instrumented code to permit a runtime dynamic dataflow tracking to recover missing profiling data by inference, based on the probabilistic model; and
   creating an actual execution and information flow of an execution of the retrieved code listing.

2. The method of claim 1, wherein said probabilistic model comprises a Hidden Markov Model of said retrieved code with profiling instructions.

3. The method of claim 1, wherein said executing causes additional code not present in the static analysis to be inserted for execution.

4. The method of claim 3, wherein said additional code comprises at least one of native code and at least one complex library.

5. The method of claim 3, wherein said profiling instructions are inserted at branch points as visible during said static analysis, before any additional coding is inserted dynamically during said executing said code.

6. A non-transitory storage medium having tangibly embodied thereon a set of computer-readable instructions to causing a processor on a computer to perform a method comprising:
   retrieving a code listing from a memory;
   performing a static analysis on said retrieved code listing to extract an approximate model of operations of the code listing including potential effects on changes of variables and values;
   based on said static analysis, creating an instrumented code by inserting profiling instructions at selected branch points of the retrieved code listing that collects sparse profiling data of execution and dataflow of the code listing, wherein the sparse profiling bypasses an execution and dataflow analysis of native code and dynamically loaded code;
   developing a probabilistic model for the retrieved code;
   executing the instrumental code to permit a runtime dynamic dataflow tracking to recover missing profiling data by inference, based on the probabilistic model; and
   creating an actual execution and information flow of an execution of the retrieved code listing.

7. The non-transitory storage medium of claim 6, as comprising one of:
   a memory device on a computer, as storing instructions that can be selectively executed by a processor on said computer or that can be downloaded by said processor onto another computer via a network;
   a memory device on said computer, as storing instructions currently being executed by said processor; and
   a standalone storage device that can be selectively inserted into an input port of said computer, for purpose of uploading said instructions into a memory device on said computer.

8. The non-transitory memory device of claim 7, as comprising one of:
   a memory device on a server in a network; and
   a memory device on a computer providing a cloud service.

9. The non-transitory memory device of claim 6, wherein said probabilistic model comprises a Hidden Markov Model of said retrieved code with profiling instructions.

10. The non-transitory memory device of claim 6, wherein said executing causes additional code not present in the static analysis to be inserted for execution.

11. The non-transitory memory device of claim 6, wherein said additional code comprises at least one of native code and at least one complex library.

12. The non-transitory memory device of claim 6, wherein said profiling instructions are inserted at branch points as visible during said static analysis, before any additional coding is inserted dynamically during said executing said code.

13. An apparatus, comprising:
- a processor; and
- a memory accessible to said processor, wherein said memory stores a set of instructions that to cause said processor to perform a method comprising:
  - retrieving a code listing from said memory;
  - performing a static analysis on said retrieved code listing to extract an approximate model of operations of the code listing including potential effects on changes of variables and values;
  - based on the static analysis, creating an instrumented code by inserting profiling instructions at selected branch points of the retrieved code listing that collects sparse profiling data of execution and dataflow of the code listing, wherein the sparse profiling bypasses execution and dataflow analysis of native code and dynamically loaded code;
  - developing a probabilistic model for the retrieved code;
  - executing the instrumented code to permit a runtime dynamic dataflow tracking to recover missing profiling data by inference, based on the probabilistic model; and
  - creating an actual execution and information flow of an execution of the retrieved code listing.

14. The apparatus of claim 13, as comprising one of:
- a server on a network; and
- a computer providing a cloud service for an application that uses said method.

15. The apparatus of claim 13, wherein said probabilistic model comprises a Hidden Markov Model of said retrieved code with profiling instructions.

16. The apparatus of claim 13, wherein said executing causes additional code not present in the static analysis to be inserted for execution.

17. The apparatus of claim 16, wherein said additional code comprises at least one of native code and at least one complex library.

18. The apparatus of claim 16, wherein said profiling instructions are inserted at branch points as visible during said static analysis, before any additional coding is inserted dynamically during said executing said code.

\* \* \* \* \*